ADAPTER SPINDLE FOR RECORD CHANGERS

Filed Nov. 22, 1963 3 Sheets-Sheet 1

INVENTOR.
JOHN A. RANKIN
BY Brown, Jackson, Boettcher & Dienner
Attys.

March 15, 1966 J. A. RANKIN 3,240,499

ADAPTER SPINDLE FOR RECORD CHANGERS

Filed Nov. 22, 1963 3 Sheets-Sheet 2

INVENTOR.
JOHN A. RANKIN
BY Brown, Jackson, Boettcher & Dienner
Attys.

INVENTOR.
JOHN A. RANKIN
BY Brown, Jackson,
Boettcher & Dienner,
Attys.

United States Patent Office 3,240,499

Patented Mar. 15, 1966

3,240,499

ADAPTER SPINDLE FOR RECORD CHANGERS

John A. Rankin, St. Joseph, Mich., assignor to V-M Corporation, Benton Harbor, Mich., a corporation of Michigan Filed Nov. 22, 1963, Ser. No. 325,691

14 Claims. (Cl. 274—10)

The present invention relates to an adapter spindle for record changers. More specifically, the invention relates to a large diameter adapter spindle designed to slip over a conventional small diameter center spindle of a record changer to adapt the latter for handling 45 r.p.m. records of the type having a large centerhole.

It is well known in the art to provide an adapter spindle having an outer diameter of approximately 1.5 inches which can be mounted over the conventional small diameter center spindle of a record changer to permit the latter to accommodate 45 r.p.m. records of the type having a large centerhole. Such known adapter spindles are generally fixedly associated with the small diameter center spindle so that both are stationary while the record changer turntable rotates during playing of a record. However, in one known type of adapter a lower cylindrical housing portion comprises a rotor which engages the upper surface of the turntable so as to be rotated thereby and which serves as a means for centering records on the turntable.

It will of course be understood that some means must be provided for centering a 45 r.p.m. record on the turntable for playing. In one known form of adapter spindle the stationary cylindrical adapter housing simply extends down substantially to the turntable whereby the lower end of the housing serves to center the records. In another type of known structure, as mentioned above, a cylindrical rotor member is carried at the lower end of the adapter housing and serves as a record centering member. Such a rotor member has the same cylindrical configuration and dimensions as the upper adapter housing except that it is mounted for rotation about the axis of the adapter spindle and is generally urged downwardly against the top of the turntable so as to be rotated thereby during playing of a record. In adapter spindles of the type having such a rotor, the main housing of the adapter is generally provided at its lower end with an axially disposed downwardly projecting cylindrical extension having a diameter of approximately 0.75 inch, and the rotor is provided with an internal tubular sleeve which fits over the extension so as to rotatably mount the rotor thereon. Reference may be had to Van Antwerp Patent 2,918,288, issued December 22, 1959 and assigned to the assignee of the present invention, for a more complete description of a conventional adapter spindle of the type having a cylindrical rotor member at its lower end.

The foregoing known types of adapter spindles, while commonly used, are subject to certain significant disadvantages due to the configuration of the record centering means and the manner in which it operates to center records on the turntable. In the case where the stationary housing centers the records, the housing is cylindrical and is of a diameter only slightly less than the diameter of the large record centerhole, whereby as a record is rotated on the turntable there is sliding contact between the housing and the record around substantially the entire periphery of the record centerhole. The use of the cylindrical rotor eliminates the sliding contact between the record and the adapter spindle, but with this design there is an extensive area of sliding contact between the rotor sleeve and the relatively large diameter tubular housing extension on which it is carried thus causing appreciable friction.

It is an object of the present invention to provide an improved adapter spindle which overcomes the above-mentioned disadvantages and which is unusually economical to manufacture.

A further object of the invention is to provide an adapter spindle having improved record centering means which engages only a fragmentary portion of the periphery of the centerhole of a record on the turntable so as to substantially reduce the area of contact between the record and the record centering means.

In furtherance of the foregoing object, I provide in one of the embodiments of my invention an adapter spindle having a record centering means comprising a single roller of relatively small diameter mounted on an axis substantially offset from the axis of the record changer turntable so that the surface of the roller engages a record mounted on the turntable at the periphery of its centerhole for centering the record. In combination therewith there is provided an adapter housing, the lower end of which is recessed so that no portion of the housing engages the record, whereby the record is centered on the turntable solely through engagement with the single small diameter offset centering roller. The centering roller is rotatably mounted by means of a small diameter pin or the like so as to substantially reduce the amount of friction present in the design.

It should be understood that the diameter of the centering roller described above is preferably less than one-half the diameter of the large record centerhole, and that the roller will engage the periphery of the record centerhole approximately along a line the length of which is equal to the thickness of the record at its radially inner portion. In this manner, the area of contact between the centering means and the record is reduced substantially to a minimum. Of course centering means of this type will not prevent a record from being manually moved on the turntable to an off-center position, but it is important to note that when the record changer is in operation, and the turntable thus rotating, the small centering roller will continuously engage successive portions of the periphery of the record centerhole as the record rotates so as to continuously assure that the record is properly centered on the turntable.

Other objects and advantages of my invention will appear, or be obvious, from the following description of a preferred embodiment in which.

Figure 8:
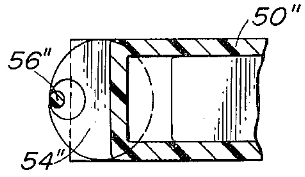
Figures 7, 9:
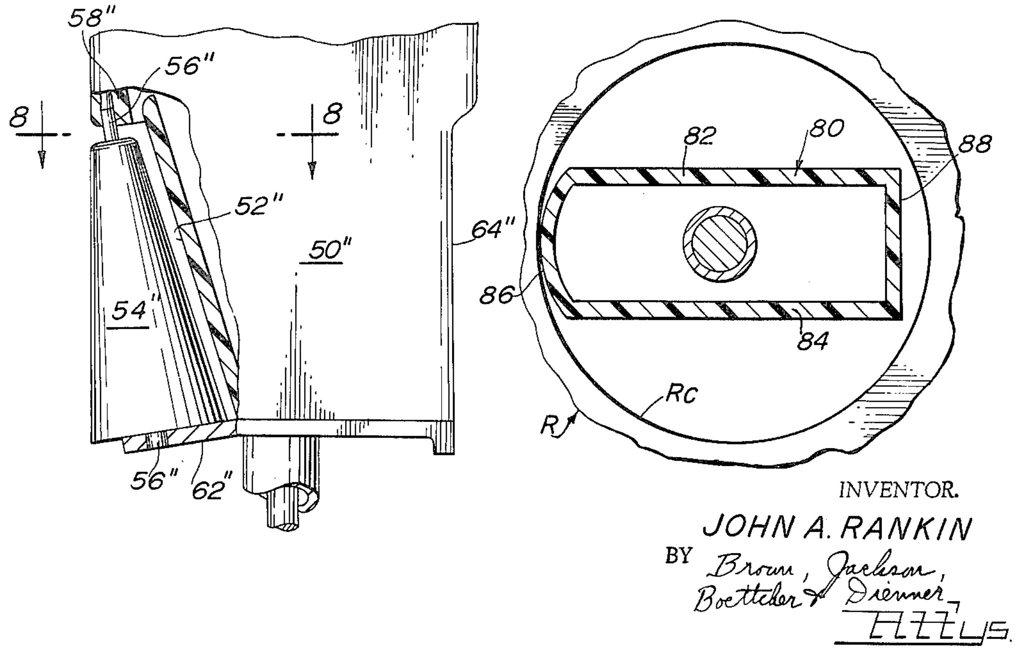
FIGURE 7 is a fragmentary vertical section showing a further alternative embodiment of the invention.

FIGURE 8 is a reduced fragmentary horizontal section taken substantially along the line 8—8 of FIGURE 7; and FIGURE 9 is a horizontal section showing still another alternative embodiment of the invention wherein a portion of the adapter spindle housing itself is designed to engage a small fragmentary portion of the periphery of the centerhole of a record on the turntable so as to center the same, the remainder of the adapter housing being recessed so as not to engage the periphery of the record centerhole.

Figure 1:
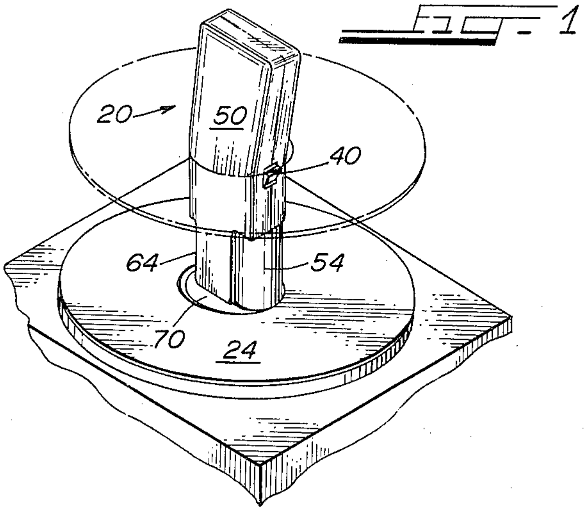
FIGURE 1 is a reduced perspective view illustrating an adapter spindle constructed in accordance with the present invention mounted over the small diameter center spindle of a record changer so as to extend substantially down to the turntable.
Figure 2:
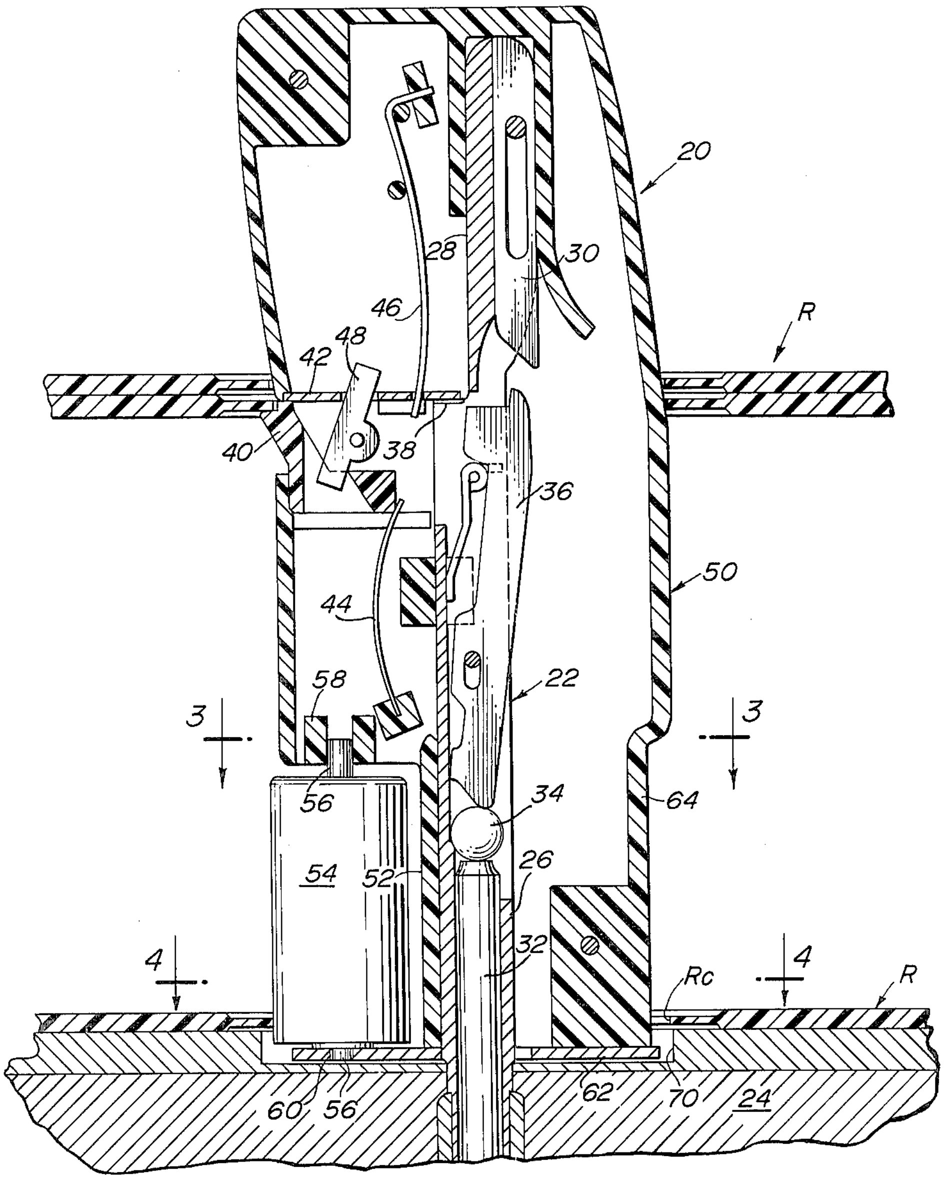
FIGURE 2 is a vertical section, partly broken away, of the apparatus of FIGURE 1, illustrating in particular the manner in which the single small diameter offset centering roller extends downwardly into the centerhole of a record on the turntable so as to engage the periphery of the centerhole.

Referring now to the drawings, FIGURES 1 and 2 show an adapter spindle 20 mounted over a small diameter center spindle 22 so as to extend substantially down to a turntable 24. The small diameter turntable spindle 22 is of known construction and includes a body member 26, an offset upper end portion 28, a slidable member 30, an axially slidable actuator rod 32, a ball 34 and an ejector lever 36. It will be understood that when the turntable spindle 22 is operated without the adapter 20, the ejector lever 36 is adapted to push records one at a time off of a shoulder 38 so as to feed them to the turntable 24 for playing. The adapter spindle 20 is itself provided with record feeding mechanism including a shelf member 40, a separator blade 42, a spring 44 for biasing the shelf member radially outwardly, a spring 46 for biasing the separator blade radially inwardly, and a pivotally mounted bellcrank lever 48 for retracting the shelf member 40 whenever the blade member 42 is extended. The foregoing record feeding mechanism of the adapter spindle 20 is described more fully in the copending application of Richard W. Simpson, Serial No. 325,960, filed November 22, 1963, and assigned to the assignee of the present invention.

Figure 3:
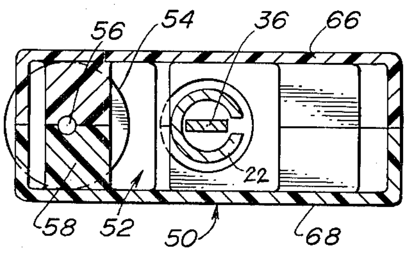
FIGURE 3 is a horizontal section taken substantially along the line 3—3 of FIGURE 2.

The adapter spindle 20 includes a housing 50 which is generally rectangular in its cross sectional configuration (see FIGURES 1 and 3), and at one side thereof adjacent its lower end the housing is recessed substantially so as to form a chamber or well 52 to accommodate a centering roller 54. It will be seen from FIGURE 2 that the diameter of the roller 54 is substantially less than one-half of the diameter of the centerhole in a record R of the type having a large centerhole of approximately 1.5 inches. The roller 54 is fixedly carried on a small diameter pin 56 which is mounted for rotation about a vertical axis. The upper end of the pin 56 is journaled in a bearing 58 which comprises a portion of the adapter housing 50, and the lower end of the pin is journaled in a bearing 60 formed in a flat bottom plate 62 which is secured in any suitable manner to the underside of the housing 50.

In the embodiment being described the roller 54 is cylindrical and is disposed vertically in the well 52 for rotation about a vertical axis. The roller 54 is positioned so that the radially outermost portion thereof is spaced from the central axis of the turntable 24 by a distance equal to one-half the diameter of the centerhole of a large centerhole record R. Consequently, when the turntable is rotating as during playing of a record the roller 54 serves to accurately center any records R which are disposed thereon.

Figure 4:
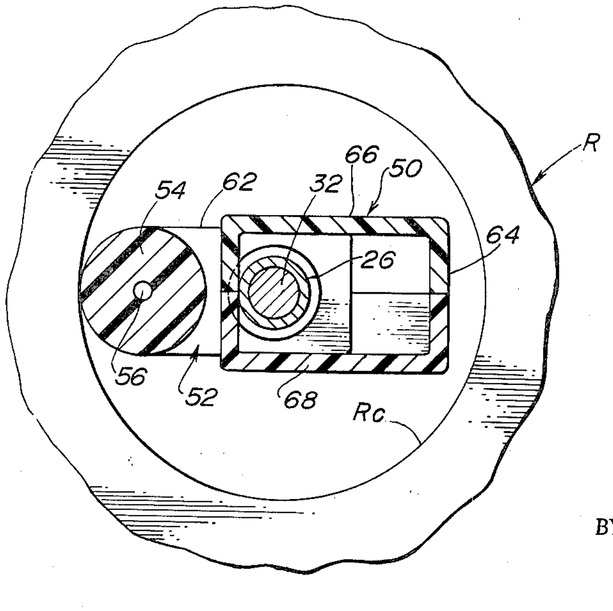
FIGURE 4 is a horizontal section taken substantially along the line 4—4 of FIGURE 2.

The housing 50 is recessed at its lower end opposite the roller 54 so as to provide a recessed wall portion 64 which is spaced from the central axis of the turntable 24 by a distance less than one-half the diameter of the centerhole of the records R. It will thus be understood that no portion of the housing 50 will engage the periphery of the centerhole of a record which is centered on the turntable 24, and consequently centering of the records on the turntable is effected solely by the roller 54. More specifically, with reference to FIGURE 4, it will be seen that the housing 50 comprises oppositely disposed walls 66 and 68 and the recessed wall portion 64, and that none of these walls engages the periphery $R_c$ of the record centerhole. It will further be understood from FIGURE 4 that the roller 54 engages the peripheral edge $R_c$ substantially only along a line the length of which is equal to the thickness of the radially inner portion of the record R.

Referring again to FIGURE 2, the turntable 24 is provided with a central depressed well portion 70 which is of circular configuration, and the lower end of the adapter spindle 20 extends down into the well 70 so as to project downwardly through the centerhole of a record on the turntable. While a relatively deep well 70 is shown in the drawing for purposes of illustration, it will be understood that it may be relatively shallow, the important criteria being that the lower end of the roller 54 must extend downwardly into the centerhole of a record on the turntable 24 so as to engage against the periphery $R_c$. It is also desirable that the bottom plate 62 of the adapter not engage against the base of the well 70 so as to avoid friction between the adapter spindle and the turntable as the latter rotates.

Reviewing briefly the operation of the foregoing embodiment of my invention, a plurality of records R of the type having a large centerhole are supported on the upper portion of the spindle housing 50 by the shelf member 40 and are dropped one at a time to the turntable 24 for playing. When a record is disposed on the turntable in a centered position thereon it is not engaged by any portion of the adapter spindle housing 50, since the latter is recessed so that its radially outermost portion is spaced from the central axis of the turntable by a distance less than one-half of the diameter of the record centerhole. Consequently, centering of the record is effected solely by the single roller 54 which is rotatably mounted on a vertical axis and located so that the radially outermost portion of the roller is spaced from the central axis of the turntable by a distance equal to one-half of the diameter of a record centerhole. The centering roller 54 is preferably of a diameter less than one-half of the diameter of a record centerhole, and it is rotatably mounted by a small diameter pin so as to substantially reduce the friction in the roller mounting.

As the turntable 24 rotates, the roller 54 will engage the periphery $R_c$ of the record centerhole and thereby continuously maintain the record in a centered position on the turntable, and the roller will be rotated about its own axis due to such contact with the record. While the record is continuously maintained in a centered position, this is not to say that the roller will be in continuous engagement with the record, since once the roller has served its function of centering the record, it will normally not rotate. In other words, when the roller is actually performing a centering function it is rotated through engagement with the periphery of the record centerhole, and once such function has been accomplished, the roller will remain stationary unless the record becomes displaced from its centered position.

It should be noted that the extent to which the housing wall 64 is recessed may be varied considerably. That is, the wall 64 may be recessed a substantially greater amount than shown in FIGURE 2, and on the other hand it may be recessed only a very slight amount so as to barely be noticeable, the important aspect of the design being that the housing wall does not engage a record which is centered on the turntable.

Figure 5:
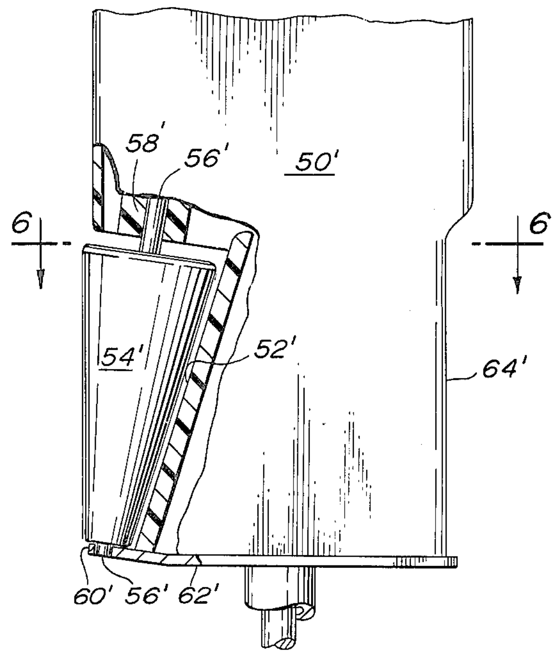
FIGURE 5 is a fragmentary vertical section illustrating an alternative embodiment of the invention wherein the centering means comprises a single frusto-conical roller mounted on an inclined axis so that the radially outer surface thereof is vertical and is adapted to engage the periphery of the centerhole of a record on the turntable.
Figure 6:
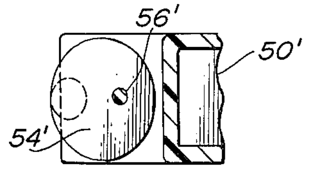
FIGURE 6 is a reduced fragmentary horizontal section taken substantially along the line 6—6 of FIGURE 5.

FIGURES 5 and 6 show an alternative embodiment of the invention wherein a spindle adapter housing 50′ is recessed at its lower end at one side thereof to provide a chamber or well 52′ in which a record centering roller 54′ is mounted. The housing is also recessed at its lower end opposite the roller as at 64′ so that a record on the turntable will be engaged only by the radially outermost portion of the roller 54′. The centering roller 54′ is frusto-conical in its configuration and is mounted with its smaller end disposed generally downwardly. The roller is carried on a pin 56' which has its upper end journaled in a bearing 58' which forms a part of the housing 50' and its lower end journaled in a bearing 60' formed in a bottom plate member 62'. The axis of the pin 56' is inclined to the vertical by an angle equal to the angle defined by the pin 56' and the surface of the roller, whereby the radially outermost portion of the roller will define a vertical surface, and the roller is positioned so that such vertical surface will be spaced from the central axis of the turntable by a distance equal to one-half the diameter of a record centerhole.

FIGURES 7 and 8 show another alternative embodiment which is similar to the embodiment of FIGURES 5 and 6 except in this instance a frusto-conical roller 54'' is positioned with its larger end disposed generally downwardly, and of course the pin 56'' is inclined in the opposite direction so as to maintain the radially outermost portion of the roller 54'' as a vertically disposed surface spaced from the central axis of the turntable by a distance equal to one-half the diameter of a record centerhole.

FIGURE 9 shows a still further embodiment of the invention wherein no centering roller is provided, but instead a portion of the adapter spindle housing itself serves as a record centering member. FIGURE 9 comprises a horizontal section through the adapter spindle housing at the lower end thereof and illustrates the manner in which the housing itself performs a record centering function. There is shown a housing 80 which is approximately rectangular in its cross sectional configuration and comprises oppositely disposed side walls 82 and 84 and oppositely disposed end walls 86 and 88. There is also shown a record R of the type having a large centerhole the periphery of which is indicated at $R_c$.

The record R is shown as when properly centered on a turntable, and it will be seen that as in the case of the embodiments described earlier herein the oppositely disposed side walls 82 and 84 of the adapter spindle housing are substantially spaced inwardly from the periphery $R_c$ of the record centerhole. In addition, the housing 80 is recessed at its lower end opposite the end wall 86 so as to provide a recessed wall 88 which is also spaced inwardly from the periphery of the record centerhole. Consequently, a record centered on the turntable will engage the housing 80 only at the end wall portion 86, and the latter is preferably rounded as shown in the drawing to minimize the area of contact. In other words, the arcuate housing wall 86 serves substantially the same function as the cylindrical roller 54 of the embodiment of FIGURE 2, although the roller does provide certain advantages since it is rotated by the record and thus offers less resistance to rotation of the record and reduces wear at the periphery of the record centerhole. In this respect however it should be understood that the embodiment of FIGURE 9 provides important advantages over the known adapters wherein a stationary cylindrical housing extends into the centerhole of a record for centering the same and engages the record around the entire periphery of its centerhole, since in the present design the housing 80 performs the desired centering function and yet the area of contact between the record and the housing is reduced substantially to a minimum.

While I have described certain preferred forms of my invention I do not intend to be limited to such forms, except insofar as the appended claims are so limited, since other arrangements within the scope of my invention will readily occur to others with my disclosure before them.

I claim:

1. In an adapter spindle of the type designed to slip over a small diameter center spindle of a record changer for dropping large centerhole records one at a time to a turntable and for centering such records on the turntable for playing, the improvement comprising, in combination, an adapter spindle housing recessed at its lower end so as to be spaced radially inwardly from the entire periphery of the centerhole of a record which is centered on the turntable, and record centering means for centering a record on the turntable, said centering means consisting of a single centering roller rotatably mounted on the adapter spindle and positioned so that when in use a radially outermost vertical roller surface is spaced from the central axis of the turntable by a distance equal to one-half the diameter of the record centerhole, and said roller being of a diameter substantially less than the diameter of said centerhole and being positioned eccentrically relative to the turntable so as to extend downwardly into the centerhole of a record on the turntable with said radially outermost roller surface in engagement with a fragmentary portion of the periphery of the centerhole of the record and thereby continuously center the same on the turntable as the latter rotates.

2. In an adapter spindle of the type designed to slip over a small diameter center spindle of a record changer for dropping large centerhole records one at a time to a turntable and for centering such records on the turntable for playing, the improvement comprising, in combination, an adapter spindle housing recessed at its lower end so as to be spaced radially inwardly from the entire periphery of the centerhole of a record which is centered on the turntable, and record centering means for centering a record on the turntable, said centering means consisting of a single centering roller rotatably mounted on the adapter spindle and positioned so that when in use a radially outermost vertical roller surface is spaced from the central axis of the turntable by a distance equal to one-half the diameter of the record centerhole, and said roller being of a diameter less than one-half the diameter of said centerhole and being positioned eccentrically relative to the turntable so as to extend downwardly into the centerhole of a record on the turntable with said radially outermost roller surface in engagement with a fragmentary portion of the periphery of the centerhole of the record and thereby continuously center the same on the turntable as the latter rotates.

3. In an adapter spindle of the type designed to slip over a small diameter center spindle of a record changer for dropping large centerhole records one at a time to a turntable and for centering such records on the turntable for playing, the improvement comprising, in combination, an adapter spindle housing recessed at its lower end so as to be spaced radially inwardly from the entire periphery of the centerhole of a record which is centered on the turntable, and record centering means for centering a record on the turntable, said centering means consisting of a single cylindrical centering roller mounted on the adapter spindle for rotation about a vertical axis and positioned so that when in use a radially outermost vertical roller surface is spaced from the central axis of the turntable by a distance equal to one-half the diameter of the record centerhole, and said roller being of a diameter substantially less than the diameter of said centerhole and being positioned eccentrically relative to the turntable so as to extend downwardly into the centerhole of a record on the turntable with said radially outermost roller surface in engagement with a fragmentary portion of the periphery of the centerhole of the record and thereby continuously center the same on the turntable as the latter rotates.

4. In an adapter spindle of the type designed to slip over a small diameter center spindle of a record changer for dropping large centerhole records one at a time to a turntable and for centering such records on the turntable for playing, the improvement comprising, in combination, an adapter spindle housing recessed at its lower end so as to be spaced radially inwardly from the entire periphery of the centerhole of a record which is centered on the turntable, and record centering means for centering a record on the turntable, said centering means consisting of a single cylindrical centering roller mounted on the adapter spindle for rotation about a vertical axis and positioned so that when in use a radially outermost vertical roller surface is spaced from the central axis of the turntable by a distance equal to one-half the diameter of the record centerhole, and said roller being of a diameter substantially less than one-half the diameter of said centerhole and being positioned eccentrically relative to the turntable so as to extend downwardly into the centerhole of a record on the turntable with said radially outermost roller surface in engagement with a fragmentary portion of the periphery of the centerhole of the record and thereby continuously center the same on the turntable as the latter rotates.

5. The invention of claim 4 wherein said cylindrical centering roller is rotatably mounted by means of a small diameter axial pin which extends outwardly from each end thereof and is journaled in bearing means provided on the adapter spindle.

6. In an adapter spindle of the type designed to slip over a small diameter center spindle of a record changer for dropping large centerhole records one at a time to a turntable and for centering such records on the turntable for playing, the improvement comprising, in combination, an adapter spindle housing generally rectangular in its cross sectional configuration, said housing having a well formed in one of its radially outermost sides proximate the lower end thereof and the side of said housing opposite said well being recessed at its lower end so that the lower end of said housing is spaced radially inwardly from the entire periphery of the centerhole of a record which is centered on the turntable, and record centering means for centering a record on the turntable, said centering means consisting of a single cylindrical centering roller mounted on the adapter spindle in said well for rotation about a vertical axis and positioned so that when in use a radially outermost vertical roller surface is spaced from the central axis of the turntable by a distance equal to one-half the diameter of the record centerhole, and said roller being of a diameter less than one-half the diameter of said centerhole and being positioned eccentrically relative to the turntable so as to extend downwardly into the centerhole of a record on the turntable with said radially outermost roller surface in engagement with a fragmentary portion of the periphery of the centerhole of the record and thereby continuously center the same on the turntable as the latter rotates.

7. In an adapter spindle of the type designed to slip over a small diameter center spindle of a record changer for dropping large centerhole records one at a time to a turntable and for centering such records on the turntable for playing, the improvement comprising, in combination, an adapter spindle housing recessed at its lower end so as to be spaced radially inwardly from the entire periphery of the centerhole of a record which is centered on the turntable, and record centering means for centering a record on the turntable, said centering means consisting of a single frusto-conical centering roller rotatably mounted on the adapter spindle with its axis inclined to the vertical and positioned so that when in use a radially outermost roller surface is disposed vertically and spaced from the central axis of the turntable by a distance equal to one-half the diameter of the record centerhole, and said roller being of an average diameter substantially less than the diameter of said centerhole and being positioned eccentrically relative to the turntable so as to extend downwardly into the centerhole of a record on the turntable with said radially outermost roller surface in engagement with a fragmentary portion of the periphery of the centerhole of the record and thereby continuously center the same on the turntable as the latter rotates.

8. The invention of claim 7 wherein the average diameter of said frusto-conical roller is less than one-half the diameter of said record centerhole.

9. The invention of claim 7 wherein said frusto-conical roller is disposed with its smaller end extending generally downwardly.

10. The invention of claim 7 wherein said frusto-conical roller is disposed with its smaller end extending generally upwardly.

11. In an adapter spindle of the type designed to slip over a small diameter center spindle of a record changer for dropping large centerhole records one at a time to a turntable and for centering such records on the turntable for playing, the improvement comprising, in combination, an adapter spindle housing generally rectangular in its cross sectional configuration, said housing having a well formed in one of its radially outermost sides proximate the lower end thereof and the side of said housing opposite said well being recessed at its lower end so that the lower end of said housing is spaced radially inwardly from the entire periphery of the centerhole of a record which is centered on the turntable, and record centering means for centering a record on the turntable, said centering means consisting of a single frusto-conical centering roller rotatably mounted on the adapter spindle in said well with its axis inclined to the vertical and positioned so that when in use a radially outermost roller surface is disposed vertically and spaced from the central axis of the turntable by a distance equal to one-half the diameter of the record centerhole, and said roller being of an average diameter substantially less than the diameter of said centerhole and being positioned eccentrically relative to the turntable so as to extend downwardly into the centerhole of a record on the turntable with said radially outermost roller surface in engagement with a fragmentary portion of the periphery of the centerhole of the record and thereby continuously center the same on the turntable as the latter rotates.

12. In an adapter spindle of the type designed to slip over a small diameter center spindle of a record changer for dropping large centerhole records one at a time to a turntable and for centering such records on the turntable for playing, the improvement comprising, in combination, an adapter spindle housing which when in position on a record changer extends substantially down to the turntable, a portion of the lower end of said housing having a radially outer vertically disposed record centering surface which extends downwardly into the centerhole of a record on the turntable in engagement with a fragmentary portion of the periphery of the centerhole of the record, said vertically disposed record centering surface being spaced from the central axis of the turntable by a distance equal to one-half the diameter of the record centerhole, and the entire remainder of the lower end of said housing being recessed so as to be spaced radially inwardly from the periphery of the centerhole of a record which is centered on the turntable, whereby a record on the turntable will be engaged by said housing only at said record centering surface which will continuously center a record on the turntable as the latter rotates.

13. The invention of claim 12 wherein said housing is generally rectangular in its cross sectional configuration and wherein one of the radially outermost sides of the housing at the lower end thereof comprises said record centering surface and the side of the housing opposite said record centering surface is recessed so as to be spaced radially inwardly from the periphery of the centerhole of a record centered on the turntable.

14. The invention of claim 13 wherein said record centering surface is arcuate as viewed in horizontal section.

References Cited by the Examiner

UNITED STATES PATENTS

| | | | |
|---|---|---|---|
| 2,918,288 | 12/1959 | Van Antwerp | 274—10 |
| 2,918,289 | 12/1959 | Hardy | 274—10 |
| 3,107,098 | 10/1963 | Hardy | 274—10 |

NORTON ANSHER, *Primary Examiner.*